United States Patent
Tobin

(10) Patent No.: US 8,191,490 B2
(45) Date of Patent: Jun. 5, 2012

(54) DISC PLANTER FOR APPLYING FERTILISERS AND SEEDS TO SOIL

(75) Inventor: William Pias Noel Tobin, Forbes (AU)

(73) Assignee: The Gusset Pty Ltd., Forbes, New South Wales (AU)

(*) Notice: Subject to any disclaimer, the term of this patent is extended or adjusted under 35 U.S.C. 154(b) by 0 days.

(21) Appl. No.: 12/918,294

(22) PCT Filed: Feb. 20, 2009

(86) PCT No.: PCT/AU2009/000195
§ 371 (c)(1),
(2), (4) Date: Nov. 17, 2010

(87) PCT Pub. No.: WO2009/103122
PCT Pub. Date: Aug. 27, 2009

(65) Prior Publication Data
US 2011/0048297 A1    Mar. 3, 2011

(30) Foreign Application Priority Data

Feb. 20, 2008 (AU) ............................ 2008900800
May 27, 2008 (AU) ............................ 2008902662

(51) Int. Cl.
*A01C 5/00* (2006.01)
*A01C 7/00* (2006.01)
*A01C 9/00* (2006.01)
*A01C 13/00* (2006.01)
*A01C 23/00* (2006.01)

(52) U.S. Cl. ........ 111/121; 111/164; 111/167; 111/186; 111/188; 111/193; 111/195

(58) Field of Classification Search .......... 111/118–120, 111/147, 149, 152–169, 186–188, 190–196, 111/121
See application file for complete search history.

(56) References Cited

U.S. PATENT DOCUMENTS 3,664,279 A   5/1972   Belden
6,216,616 B1  4/2001   Bourgault
(Continued)

FOREIGN PATENT DOCUMENTS
CA     2 574 250    7/2007
(Continued)

*Primary Examiner* — Christopher J. Novosad
(74) *Attorney, Agent, or Firm* — Merchant & Gould P.C.

(57) ABSTRACT

A disc planter (10) for applying fertilizers and seeds to soil, and incorporating previously applied chemicals therein, the disc planter (10) having a frame (12) with a longitudinal forward direction of travel, and a plurality of rotatable tools mounted in series to the frame, the plurality of rotatable tools including a fertilizer furrow opening disc (16), a seed furrow opening disc (18), a soil throw controlling wheel (20), a soil closing wheel (22) and a soil disturbing star wheel (24), wherein the fertilizer furrow opening disc (16), seed furrow opening disc (18), and soil disturbing star wheel (24) are alternately oppositely inclined to one another in the forward direction of travel, the fertilizer furrow opening disc (16), seed furrow opening disc (18), soil throw controlling wheel (20), soil closing wheel (22) and soil disturbing star wheel (24) are longitudinally spaced and alternately laterally offset from one another in the forward direction of travel, the soil throw controlling wheel (20) is closely adjacent to and rearwardly overlapping the seed furrow opening disc (18), and the soil closing wheel (22) is laterally aligned with the seed furrow opening disc (18) in the forward direction of travel.

12 Claims, 5 Drawing Sheets

| U.S. PATENT DOCUMENTS | | | |
|---|---|---|---|
| 6,314,897 B1 | 11/2001 | Hagny | |
| 2005/0051068 A1* | 3/2005 | Swanson | 111/118 |
| 2007/0044694 A1 | 3/2007 | Martin | |
| 2007/0095261 A1* | 5/2007 | Mariman et al. | 111/164 |
| 2008/0006189 A1* | 1/2008 | Johnston et al. | 111/152 |

| FOREIGN PATENT DOCUMENTS | | |
|---|---|---|
| EP | 1 878 332 | 1/2008 |
| GB | 1 262 903 | 2/1972 |
| WO | WO 2007/050185 | 5/2007 |

* cited by examiner

US 8,191,490 B2

DISC PLANTER FOR APPLYING FERTILISERS AND SEEDS TO SOIL

This application is a National Stage Application of PCT/AU2009/000195, filed 20 Feb. 2009, which claims benefit of Serial No. 2008900800, filed 20 Feb. 2008 in Australia, and Serial No. 2008902662, filed 27 May 2008 in Australia and which applications are incorporated herein by reference. To the extent appropriate, a claim of priority is made to each of the above disclosed applications.

FIELD OF THE INVENTION

The present invention relates to disc planters for applying fertiliser and seeds to soil, and incorporating previously applied chemicals therein.

BACKGROUND OF THE INVENTION

No- or minimum-till disc planters have furrow-opening discs to apply seed to soil. Pre-emergence herbicide is often applied to soil before planting to prevent weeds from competing with seedlings. Conventional disc planters often have additional systems to apply fertiliser during planting to improve crop emergence, growth and yield.

Disadvantages of conventional disc planters include low planting speeds, high draught requirements, high fuel costs, clogging of soil in heavy or wet soils, poor trash handling ability, excessive lateral soil throw during furrow formation, poor seed to soil contact, fertiliser damage to seedlings, and excessive soil compaction. Excessive soil compaction is particularly disadvantageous because it adversely affects many soil properties among them soil moisture retention, seed to soil contact and herbicide to soil contact.

What is needed is a disc planter which addresses the above difficulties.

SUMMARY OF THE INVENTION

According to the present invention, there is provided a disc planter for applying fertilisers and seeds to soil, and incorporating previously applied chemicals therein, the disc planter having a frame with a longitudinal forward direction of travel, and a plurality of rotatable tools mounted in series to the frame, the plurality of rotatable tools including a fertiliser-furrow opening disc, a seed-furrow opening disc, a soil-throw controlling wheel, a soil-closing wheel, and a soil-disturbing star wheel, wherein the fertiliser-furrow opening disc, seed-furrow opening disc, and soil-disturbing star wheel are alternately oppositely inclined to one another in the forward direction of travel, the fertiliser-furrow opening disc, seed-furrow opening disc, soil-throw controlling wheel, soil-closing wheel, and soil-disturbing star wheel are longitudinally spaced and alternately laterally offset from one another in the forward direction of travel, the soil-throw controlling wheel is closely adjacent to and rearwardly overlapping the seed-furrow opening disc, and the soil-closing wheel is laterally aligned with the seed-furrow opening disc in the forward direction of travel.

The plurality of rotatable tools can be respectively mounted in series to the frame in pairs.

Each pair of fertiliser-furrow opening discs can be mounted to a castoring assembly. The castoring assembly can be pivotally mounted forwardly of the frame so as to be movable from a lowered operating position to a raised storage position.

Each seed-furrow opening disc, and each pair of fertiliser-furrow opening discs, soil-throw controlling wheels, and soil-disturbing star wheels, can be mounted to the frame by a resiliently pivotable trailing arm.

Each soil-disturbing star wheel can be is mounted rearwardly of the trailing arm so as to be selectively laterally positionable.

Each pair of soil-closing wheels can be mounted to the frame by a pair of fixed downwardly extending arms.

Each fertiliser-furrow opening disc, and each seed-furrow opening disc, can be inclined to both vertical and horizontal planes by an angle of less than 7°. The angle can be between 2° and 5°.

Each soil-disturbing star wheel can be inclined to both vertical and horizontal planes by an angle of less than 20°. The angle can be between 5° and 15°.

The present invention also provides a method of applying fertilisers and seeds to soil, and incorporating previously applied herbicide therein, the method including using the above disc planter.

BRIEF DESCRIPTION OF THE DRAWINGS

The invention will be further described by way of example only with reference to the accompanying drawings, in which.

DETAILED DESCRIPTION

Figure 1:
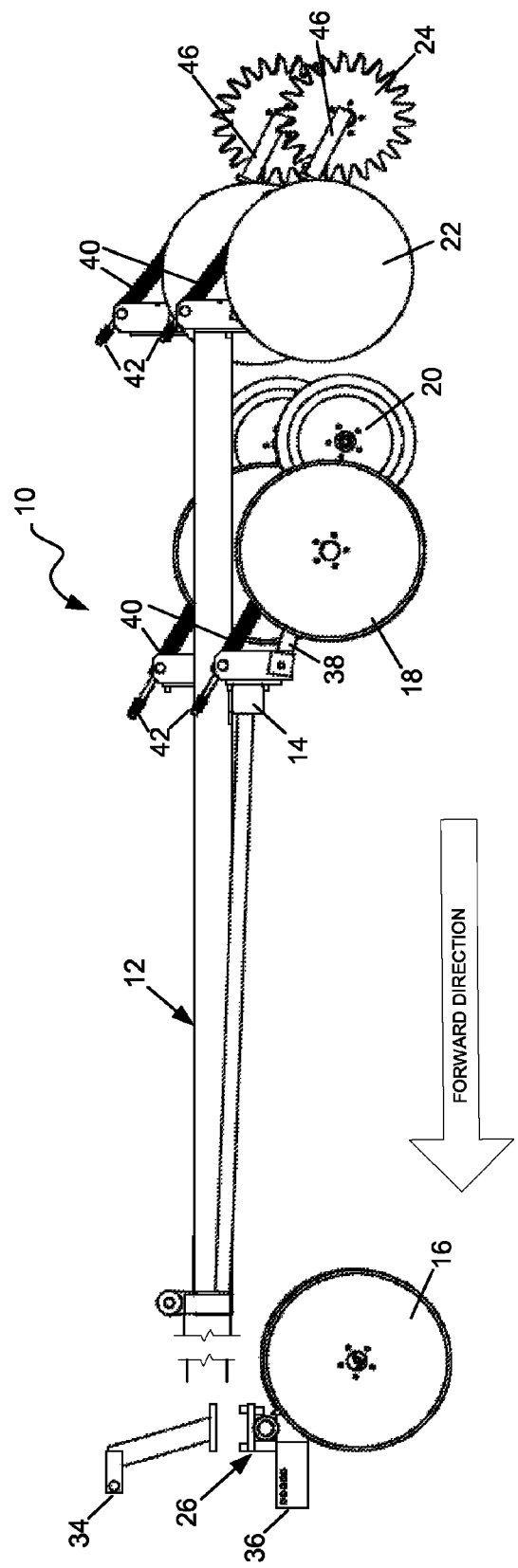
FIG. 1 is a partial side view of an embodiment of a disc planter of the invention.
Figure 2:
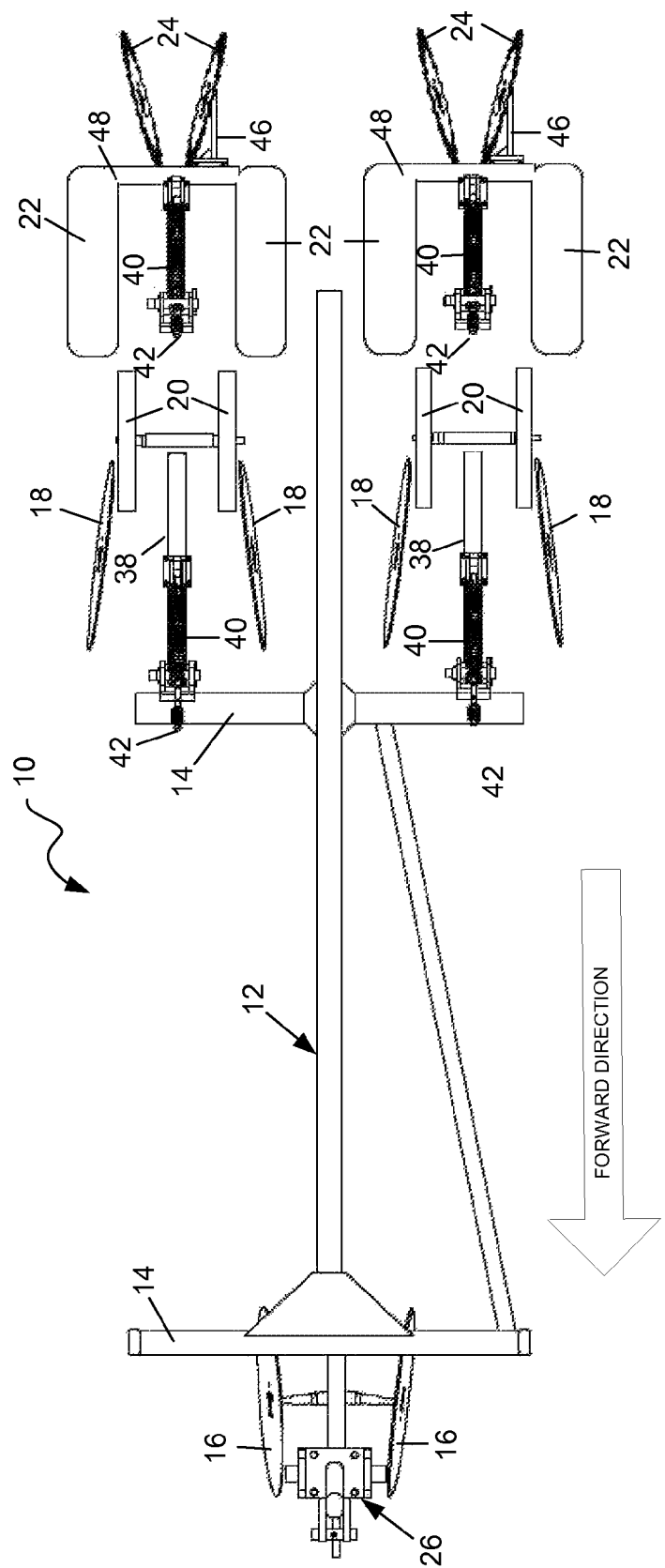
FIG. 2 is a partial top view of the disc planter.

FIGS. 1 and 2 illustrate an embodiment of a disc planter 10 of the invention for applying fertilisers and seeds to soil, and incorporating previously applied chemicals therein. The disc planter 10 has a longitudinal tool bar frame 12 with a longitudinal forward direction of travel. The frame 12 has a plurality of longitudinally spaced transverse tool bars 14 serially mounting a plurality of rotatable tools in pairs. Other equivalent single or multiple ganged arrangements may also be used to mount the plurality of rotatable tools to the frame 12.

The plurality of rotatable tools include a pair of rearwardly and downwardly diverging fertiliser-furrow opening discs 16, two laterally spaced pairs of forwardly and downwardly diverging seed-furrow opening discs 18 (axles omitted for clarity), two laterally spaced pairs of mutually parallel soil-throw controlling wheels 20, two laterally spaced pairs of mutually parallel soil-closing wheels 22 (axles omitted for clarity), and two laterally spaced pairs of rearwardly and upwardly diverging soil-disturbing star wheels 24.

Each fertiliser-furrow opening disc 16 has a closely adjacent, associated assembly (not shown), for example a fertiliser tube or boot, for depositing liquid or granular fertiliser, for example granular nitrogen fertiliser, in a fertiliser furrow opened by the fertiliser-furrow opening disc 16. Each seed-furrow opening disc 18 has a closely adjacent, associated assembly (not shown), for example a seed tube or boot, for depositing seeds in a seed-furrow opened by the seed-furrow opening disc 18. Furthermore, each fertiliser-furrow opening disc 16 and seed-furrow opening disc 18 has a closely adjacent, associated assembly (not shown), for example a scraper and/or tine, to prevent clogging of soil or trash.

Figure 4:
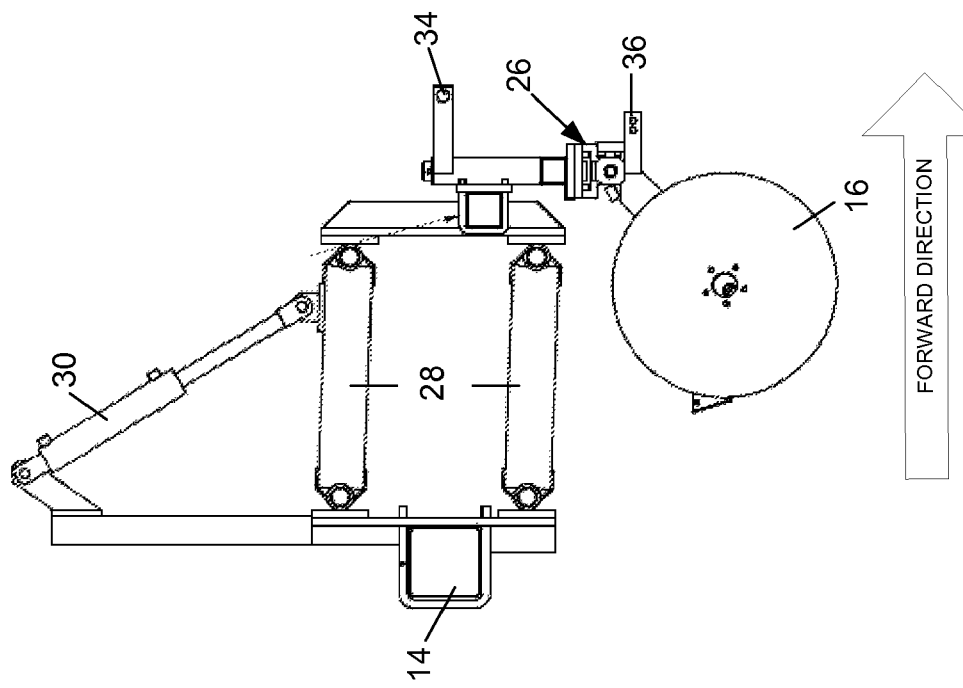
FIGS. 3 and 4 are side views of a pair of fertiliser-furrow opening discs of the disc planter in raised and lowered positions respectively.
Figure 3:
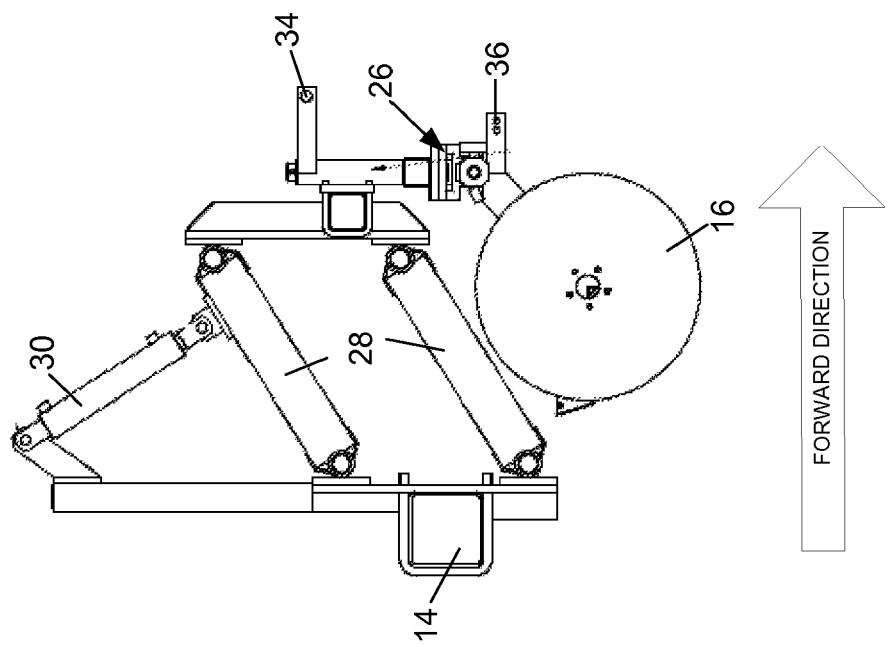

Referring to FIGS. 3 and 4, the pair of fertiliser-furrow opening discs 16 is mounted to a castoring assembly 26 so that in use they are horizontally rotatable and vertically swivellable with a castoring action when the disc planter 10 is drawn forward and turned. The castoring assembly 26 is pivoted to a tool bar 14 by a pair of dual hinged arms 28 that are movable by a hydraulic actuator 30 to move the pair of fertiliser-furrow opening discs 16 from a raised storage position (FIG. 3) to a lowered operating position (FIG. 4).

The pair of fertiliser-furrow opening discs 16 is resiliently biased downwardly by a tension (or extension) spring (not shown) that extends forwardly of the castoring assembly 26 between an upper spring mounting 34 and a lower spring mounting 36. The tension spring is connected to the upper mounting 34 by an eye bolt (not shown) which is adjustable to selectively tension the spring. The lower spring mounting 36 has a plurality of spaced spring mounting points to also selectively tension the tension spring. The downward biasing force and working depth of the pair of fertiliser-furrow opening discs 16 are selectively variable by varying the tensioning of the tension spring. The tension spring provides the pair of fertiliser-furrow opening discs 16 with resiliency against rocks and other obstacles. The castoring assembly 26 and the tension spring give the pair of the fertiliser-furrow opening discs 16 resiliency and freedom of movement in both horizontal and vertical planes against rocks or other obstacles when the disc planter 10 is drawn forward.

Figure 5:
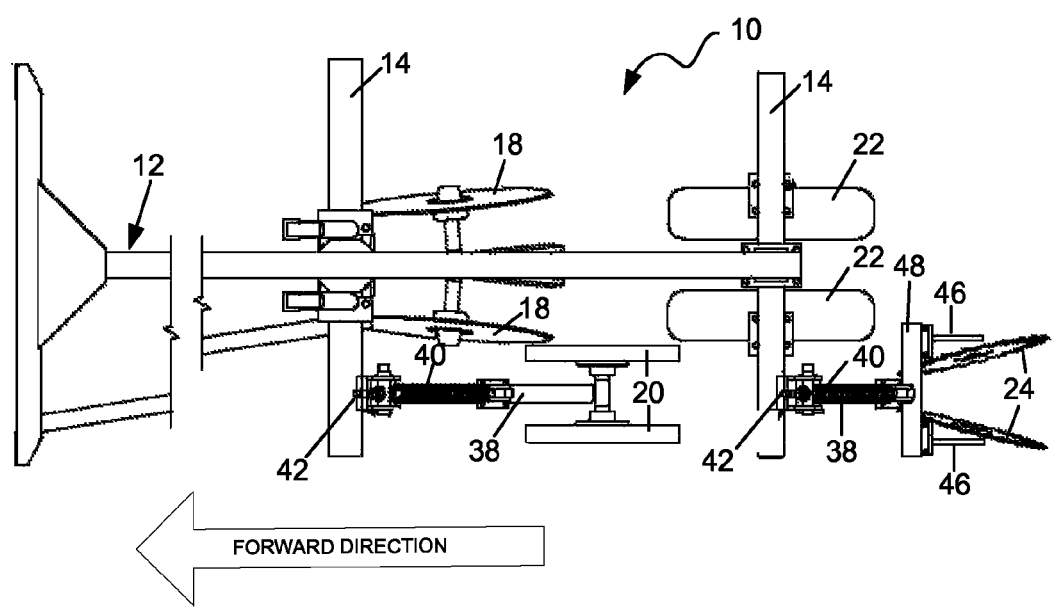
FIGS. 5 to 7 are respective top, side and perspective partial views of mounting details of seed-furrow opening discs, soil-throw controlling wheels, soil-closing wheels, and soil-disturbing star wheels of the disc planter.
Figure 6:
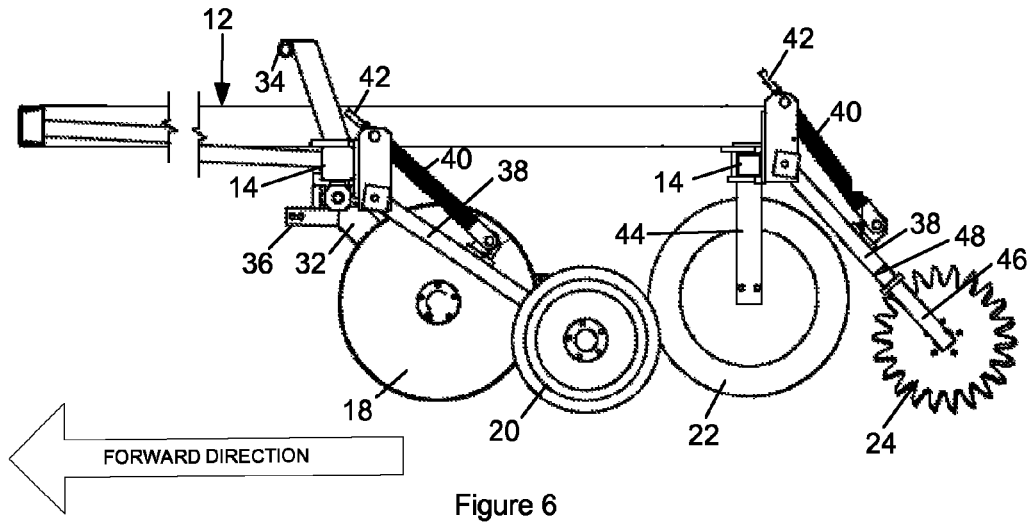
Figure 7:
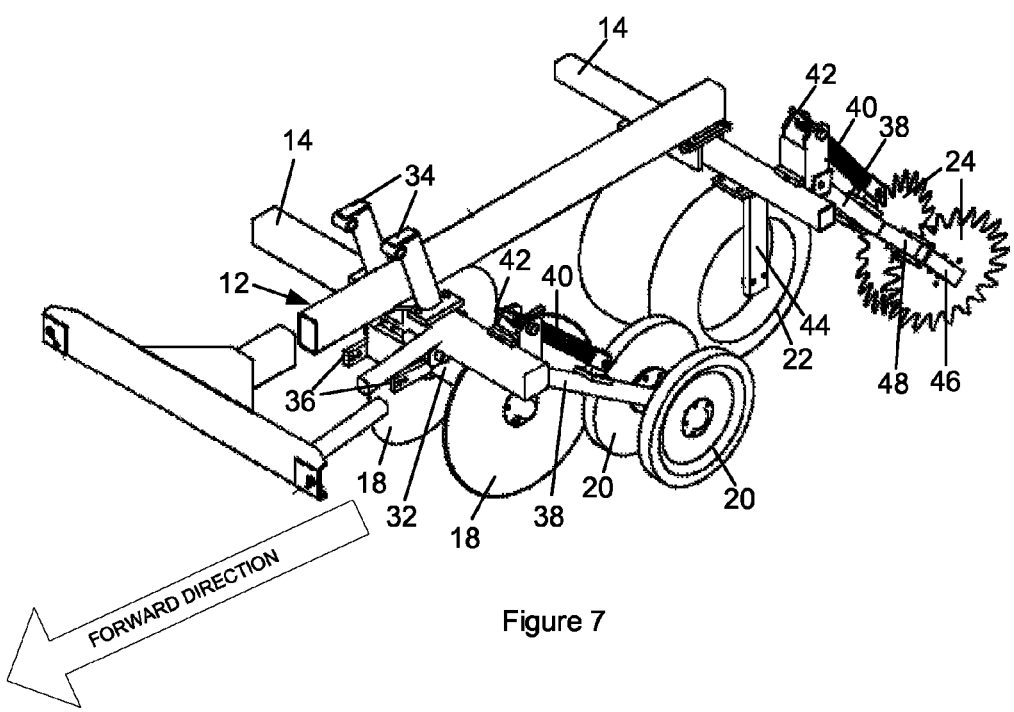

Referring to FIGS. 5 to 7, each seed-furrow opening disc 18 is mounted to a tool bar 14 by a trailing arm 32 having a forward end pivoted to the tool bar 14 and a rearward end with an axle rotatably mounting the seed-furrow opening disc 18. Each seed-furrow opening disc 18 is resiliently biased downwardly by a tension (or extension) spring (not shown) that extends forwardly of the tool bar 14 between an upper spring mounting 34 on the tool bar 14 and a lower spring mounting 36 on the trailing arm 32. The tension spring is connected to the upper mounting 34 by an eye bolt (not shown) which is adjustable to selectively tension the spring. The lower spring mounting 36 has a plurality of spaced spring mounting points to also selectively tension the tension spring. The downward biasing force and working depth of each seed-furrow opening disc 18 are selectively variable by varying the tensioning of the tension spring. The tension spring provides each seed-furrow opening disc 18 with resiliency against rocks and other obstacles when the disc planter 10 is drawn forward.

Each pair of soil-throw controlling wheels 20 and soil-disturbing star wheels 24 is mounted to a tool bar 14 by a trailing arm 38 having a forward end pivoted to the tool bar 14. Each trailing arm 38 is resiliently biased downwardly by a compression spring 40 that is compressed around a spring arm 42 having a forward end pivoted to the tool bar 14 and a rearward end pivoted to the trailing arm 38. The forward end of the spring arm 42 has a plurality of spaced spring mounting points to selectively compress the compression spring. The downward biasing force of pair of soil-throw controlling wheels 20 and soil-disturbing star wheels 24 is selectively variable by varying the spring compression using selected spring mounting points on the forward end of the spring arm 42. The compression spring 40 provides each pair of soil-throw controlling wheels 20 and soil-disturbing star wheels 24 with resiliency against rocks and other obstacles.

Each soil-closing wheel 22 is mounted to a tool bar 14 by a fixed mounting bracket 44 having a transverse axle (not shown) to rotatably carry the soil-closing wheel 22. The axles (not shown) are, for example, respectively pivotable about an axis parallel to the forward direction of travel to allow the soil-closing wheels 22 to follow transverse undulations in the ground. Each pair of soil-throw controlling wheels 20 is rotatably mounted on a transverse axle carried on a rearward end of a trailing arm 38. Each soil-disturbing star wheel 24 is rotatably mounted on an axle (not shown) provided at a rearward end of a trailing arm 46. The forward end of the trailing arm 46 is laterally slidably mounted to a transverse mounting bracket 48 provided at the rearward end of a trailing arm 38. This mounting arrangement allows each soil-disturbing star wheel 24 to be selectively laterally positionable. Other equivalent adjustable, resilient mounting arrangements may also be used to serially mount the seed-furrow opening discs 18, soil-throw controlling wheels 20, soil-closing wheels 22, and soil-disturbing star wheels 24.

Referring again to FIG. 2, the fertiliser-furrow opening discs 16, seed-furrow opening discs 18, and soil-disturbing star wheels 24 are respectively alternately oppositely inclined to one another in the forward direction of travel. Specifically, each fertiliser-furrow opening disc 16, as well as each seed-furrow opening disc 18, is inclined to both vertical and horizontal planes by an angle of less than 7°, for example between 2° and 5°. Whilst it is not intended to be bound to any particular theory, it is believed that when the disc planter 10 is drawn forward this double inclination of both the discs 16, 18 causes them not only to cut into and slice open the soil, but also to tear, turn and open it with twisting or torsional forces, instead of merely compressively cutting and compacting it. The resulting reduced soil compaction during fertiliser and seed furrow formation improves fertiliser to soil contact, soil moisture retention, and seed to soil contact. It is also believed that the double inclination of both the discs 16, 18 is more efficient in cutting through trash, hard and compacted soil, or wet and heavy soil.

Each soil-disturbing star wheel 24 is inclined to both vertical and horizontal planes by an angle of less than 20°, for example between 5° and 15°. It is believed that when the disc planter 10 is drawn forward this double inclination disturbs a top layer of soil in an amount sufficient to effectively incorporate previously chemicals, for example a liquid pre-emergence herbicide, into soil behind the soil-closing wheels 22. The pre-emergence herbicide is conventionally applied with a crop sprayer before planting, but needs a slight covering or dusting of soil to ensure it is incorporated into the soil and not lost to the atmosphere. The double inclination of the soil-disturbing star wheels 24 therefore provides improved herbicide to soil contact.

The alternate double inclinations of the fertiliser-furrow opening discs 16, seed-furrow opening discs 18, and soil-disturbing star wheels 24 enable the disc planter 10 to effectively and accurately apply fertiliser and seed to soil, as well as incorporate previously applied pre-emergence herbicide therein, in a single pass at speeds up to 30 km per hour with draught requirements of up to 66% less than conventional disc planters, resulting in reduced fuel usage, labour and other costs.

The fertiliser-furrow opening discs 16, seed-furrow opening discs 18, soil-throw controlling wheels 20, soil-closing wheels 22, and soil-disturbing star wheels 24 are respectively longitudinally spaced and alternately laterally offset from one another in the forward direction of travel. When the disc planter 10 is drawn forward, the fertiliser-furrow opening discs 16 and seed-furrow opening discs 18 respectively open laterally spaced fertiliser and seed furrows in soil. For example, the fertiliser-furrow opening discs 16 and seed-furrow opening discs 18 are respectively oriented so that each fertiliser furrow is laterally midway between each seed furrow. The lateral offset of the respective fertiliser-furrow opening discs 16 and seed-furrow opening discs 18 provides sufficient horizontal and/or vertical spacing between bands of fertiliser and seeds to prevent fertiliser damage to seeds and seedling, but close enough to make the fertiliser available to the seedlings.

The soil-throw controlling wheels 20 are respectively closely adjacent to and rearwardly overlapping the seed-furrow opening discs 18. When the disc planter 10 is drawn forward, this enables the soil-throw controlling wheels 20 to control and limit lateral and rearward throwing of soil and sods during seed furrow formation. The soil-throw controlling wheels 20 thereby retain the displaced soil closely adjacent to the seed furrow to be pressed and packed by the following soil-closing wheels 22 which are respectively laterally aligned with the seed-furrow opening discs 18 in the forward direction of travel. This provides more positive closing and compaction of the seed furrows, and improves seed to soil and seed to moisture contact.

Finally, the soil-disturbing star wheels 24 respectively follow the soil-closing wheels 22 to disturb a top layer of compacted and compressed soil adjacent to the closed seed furrows in an amount, or to a degree, sufficient to effectively incorporate a previously applied chemical, for example a liquid pre-emergence herbicide, in the soil.

The embodiments have been described by way of example only and modifications are possible within the scope of the claims which follow.

The invention claimed is:

1. A disc planter for applying fertilisers and seeds to soil, and incorporating previously applied chemicals therein, the disc planter having a frame with a longitudinal forward direction of travel, and a plurality of rotatable tools mounted in series to the frame, the plurality of rotatable tools including a fertiliser-furrow opening disc, a seed-furrow opening disc, a soil-throw controlling wheel, a soil-closing wheel, and a soil-disturbing star wheel, wherein the fertiliser-furrow opening disc, seed-furrow opening disc, and soil-disturbing star wheel are alternately oppositely inclined to one another in the forward direction of travel, the fertiliser-furrow opening disc, seed-furrow opening disc, soil-throw controlling wheel, soil-closing wheel, and soil-disturbing star wheel are longitudinally spaced and alternately laterally offset from one another in the forward direction of travel, the soil-throw controlling wheel is adjacent to and rearwardly overlapping the seed-furrow opening disc, and the soil-closing wheel is laterally aligned with the seed-furrow opening disc in the forward direction of travel.

2. A disc planter according to claim 1, wherein the plurality of rotatable tools are respectively mounted in series to the frame in pairs.

3. A disc planter according to claim 2, wherein each pair of fertiliser-furrow opening discs is mounted to a castoring assembly.

4. A disc planter according to claim 3, wherein the castoring assembly is pivotally mounted forwardly of the frame so as to be movable from a lowered operating position to a raised storage position.

5. A disc planter according to claim 2, wherein each seed-furrow opening disc, and each pair of fertiliser-furrow opening discs, soil-throw controlling wheels, and soil-disturbing star wheels, is mounted to the frame by a resiliently pivotable trailing arm.

6. A disc planter according to claim 2, wherein each pair of soil-closing wheels is mounted to the frame by a pair of fixed downwardly extending arms.

7. A disc planter according to claim 2, wherein each fertiliser-furrow opening disc, and each seed-furrow opening disc, is inclined to both vertical and horizontal planes by an angle of less than 7°.

8. A disc planter according to claim 7, wherein the angle is between 2° and 5°.

9. A disc planter according to claim 2, wherein each soil-disturbing star wheel is inclined to both vertical and horizontal planes by an angle of less than 20°.

10. A disc planter according to claim 9, wherein the angle is between 5° and 15°.

11. A disc planter according to claim 1, wherein each soil-disturbing star wheel is mounted rearwardly of a trailing arm so as to be selectively laterally positionable.

12. A method of applying fertilisers and seeds to soil, and incorporating previously applied herbicide therein, the method including using a disc planter according to claim 1.

* * * * *